(12) United States Patent
Sung et al.

(10) Patent No.: US 11,816,173 B2
(45) Date of Patent: Nov. 14, 2023

(54) METHOD AND APPARATUS FOR MANAGING USER PROFILE

(71) Applicant: KAKAO CORP., Jeju-si (KR)

(72) Inventors: So Yon Sung, Seongnam-si (KR); Ji Sun Lee, Seongnam-si (KR); Bum Sun Ryu, Seongnam-si (KR); Jee Won You, Seongnam-si (KR); Ki Byung Chae, Seongnam-si (KR); Uh Chul Kim, Seongnam-si (KR); Do Hyun Youn, Seongnam-si (KR); Young Min Park, Seongnam-si (KR); Eun Ho Son, Seongnam-si (KR); Min Jung Kim, Seongnam-si (KR); Jin Hwan Lee, Seongnam-si (KR); Jun Young Kim, Seongnam-si (KR); Hyun Ok Choi, Seongnam-si (KR); Hye Sun Kim, Seongnam-si (KR); Tae Joong Yoon, Seongnam-si (KR); Ha Na Jung, Seongnam-si (KR); Dong Keun Lee, Seongnam-si (KR); Do Yi Kim, Seongnam-si (KR); Min Jeong Yang, Seongnam-si (KR); Hong Chan Yun, Seongnam-si (KR)

(73) Assignee: KAKAO CORP., Jeju-si (KR)

( * ) Notice: Subject to any disclaimer, the term of this patent is extended or adjusted under 35 U.S.C. 154(b) by 7 days.

(21) Appl. No.: 17/563,058

(22) Filed: Dec. 28, 2021

(65) Prior Publication Data
US 2022/0207100 A1 Jun. 30, 2022

(30) Foreign Application Priority Data
Dec. 29, 2020 (KR) .................. 10-2020-0186822

(51) Int. Cl.
*G06F 16/9535* (2019.01)
*G06F 3/0482* (2013.01)
*H04L 67/306* (2022.01)

(52) U.S. Cl.
CPC ........ *G06F 16/9535* (2019.01); *H04L 67/306* (2013.01); *G06F 3/0482* (2013.01)

(58) Field of Classification Search
CPC .... G06Q 30/0185; G06Q 30/02; G06Q 50/01; G06Q 10/10; G06F 3/04817;
(Continued)

(56) References Cited

U.S. PATENT DOCUMENTS 9,208,471 B2 * 12/2015 Cross ................ G06Q 10/10
9,892,101 B1 * 2/2018 Donnelley ............. G06F 16/00
(Continued)

FOREIGN PATENT DOCUMENTS

KR 20140000931 A 1/2014
KR 10-1998378 B1 10/2019
(Continued)

OTHER PUBLICATIONS

Korean Office Action for KR Application No. 10-2020-0186822 mailed on Sep. 5, 2022 citing the above Yeference(s).
(Continued)

*Primary Examiner* — Etienne P Leroux
(74) *Attorney, Agent, or Firm* — CANTOR COLBURN LLP

(57) ABSTRACT

Disclosed are a method and an apparatus for managing a user profile. A user profile management method performed by a server according to an example embodiment includes creating a plurality of profiles corresponding to a user account, receiving a view request for a profile of the other user account in a predetermined relationship with the user account from a user terminal logged in with the user
(Continued)

account, providing a UI of a profile of the other user account including an interfacing object regarding the profile of the user account to the user account, receiving an input for selecting a profile to be displayed on the other user terminal logged in the other user account, among a plurality of profiles corresponding to the user account through the interfacing object, and matching the other user account with the selected profile.

20 Claims, 15 Drawing Sheets

(58) Field of Classification Search
CPC .. G06F 3/0488; G06F 3/04842; G06F 3/0482; G06F 16/9535; H04L 67/306; H04L 51/04; H04L 51/48; H04L 51/58
See application file for complete search history.

(56) References Cited

U.S. PATENT DOCUMENTS

| | | | |
|---|---|---|---|
| 10,742,815 B1* | 8/2020 | Tomlinson | G06F 16/951 |
| 11,201,944 B2* | 12/2021 | Bedoe | H04L 51/222 |
| 2009/0187831 A1* | 7/2009 | Tiwana | H04L 51/56 |
| | | | 715/752 |
| 2009/0204621 A1* | 8/2009 | Fagioli | G06Q 10/10 |
| 2014/0101039 A1* | 4/2014 | Oskolkov | G06Q 20/40 |
| | | | 705/40 |
| 2016/0308800 A1* | 10/2016 | Xiang | H04L 67/535 |
| 2016/0330146 A1* | 11/2016 | Yoo | H04L 12/1827 |
| 2020/0167699 A1* | 5/2020 | Cohen | H04L 51/52 |
| 2020/0228941 A1* | 7/2020 | Angapova | H04L 51/52 |
| 2023/0048703 A1* | 2/2023 | Norieda | G06Q 10/10 |

FOREIGN PATENT DOCUMENTS

| | | |
|---|---|---|
| KR | 10-2086751 B1 | 4/2020 |
| KR | 10-2020-0096935 A | 8/2020 |

OTHER PUBLICATIONS

International Search Report; International Application No. 10-2020-0186822; International Filing Date: Dec. 29, 2020; Date of mailing: Mar. 6, 2023; 25 pages, Machine translation.

* cited by examiner

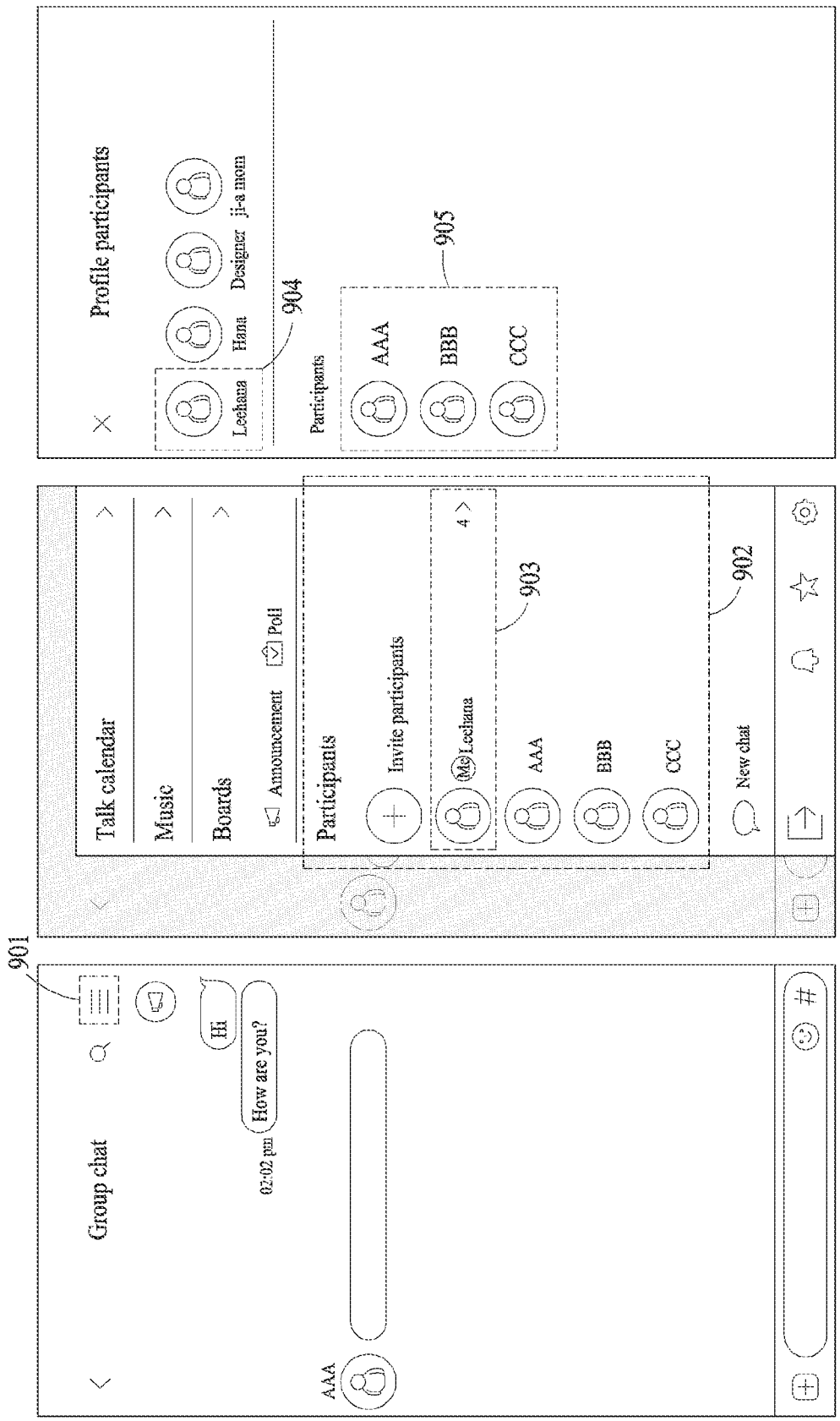

METHOD AND APPARATUS FOR MANAGING USER PROFILE

CROSS-REFERENCE TO RELATED APPLICATION

This application claims the benefit of Korean Patent Application No. 10-2020-0186822 filed on Dec. 29, 2020, in the Korean Intellectual Property Office, the entire disclosure of which is incorporated herein by reference for all purposes.

BACKGROUND

1. Field of the Invention

The following example embodiments relate to a method and apparatus for managing a user profile, and more particularly, to a server and an apparatus of performing an operation of managing a plurality of profiles corresponding to a user account.

2. Description of the Related Art

Recently, with the development of mobile smart devices, the use of online platform services for interaction with other users is being increased. As a representative example of the online platform services for interaction with other users, there are a social networking service (SNS) which is an online platform of creating and enhancing social relationships through communication, information sharing, and personal connection expansion between users and an instant messaging service (IMS) which is an online platform for real-time content communication between two or more users.

In the service such as SNS and IMS, a profile may be used to share personal information to identify the user, such as a name or a picture of the user, with the other users. The profile may be used in various ways as the means of expressing the user itself, but the profile includes personal information so that it is necessary to prevent the profile from being imprudently exposed to other people.

SUMMARY

Example embodiments may provide a technique for using various types of profiles according to a relationship between a user who uses an online platform service providing a profile and the other user.

However, the technical object is not limited to the above-described technique objects, and there may be other technique objects.

According to an aspect, a user profile management method is a user profile management method which is performed in a server including: creating a plurality of profiles corresponding to a user account; receiving a view request for a profile of the other user account in a predetermined relationship with the user account from a user terminal logged in with the user account; providing a UI of a profile of the other user account including an interfacing object regarding the profile of the user account to the user terminal; receiving an input for selecting a profile to be displayed on the other user terminal logged in with the other user account, among the plurality of profiles corresponding to the user account through the interfacing object; and matching the other user account with the selected profile.

The user profile management method may further include providing the matched profile to the other user terminal as a profile corresponding to the user account.

A profile of the other user account may correspond to a profile matched with the user account, among a plurality of profiles corresponding to the other user account.

The interfacing object may be differently displayed depending on a profile matched with the other user account.

According to an aspect, a user profile management method is a user profile management method which is performed in a server including: creating a plurality of profiles corresponding to a user account; matching other user accounts in a predetermined relationship with the user account with the plurality of profiles; providing matching information between participant accounts which are participating in a chatroom and the plurality of profiles to a user terminal which is logged in with the user account, through the chatroom in which the user account is participating; and providing a profile of the user account matched with the corresponding participant account, to a participant terminal logged in with the participant account, so as to correspond to each participant account, through the chatroom The matching of the other user accounts with the plurality of profiles may include: receiving information about the other user accounts to be matched with the corresponding profile from the user terminal so as to correspond to each of the plurality of profiles, and matching the other user accounts with the plurality of profiles based on the received information to store.

The providing of matching information may include: providing a list of participant accounts matched with the corresponding profile through a UI of the chatroom so as to correspond to each of the plurality of profiles.

The user profile management method may further include providing a profile of each of the participant accounts matched with the user account to the user terminal, through the chatroom.

According to an aspect, a user profile management method is a user profile management method performed in a user terminal which is logged in with a user account including: requesting creation of a plurality of profiles corresponding to the user account; requesting a view for a profile of the other user account in a predetermined relationship with the user account; receiving a UI of a profile of the other user account including an interfacing object regarding the profile of the user account; and selecting a profile to be displayed on the other user terminal logged in with the other user account, among the plurality of profiles corresponding to a user account through an interfacing object.

The selected profile may match with the other user account.

According to another aspect, a user profile management method is a user profile management method performed in a user terminal which is logged in with a user account including: requesting creation of a plurality of profiles corresponding to the user account, the plurality of profiles matched with the other user accounts in a predetermined relationship with the user account; receiving matching information between participant accounts which are participating in the chatroom and the plurality of profiles, through the chatroom in which the user account is participating, and receiving each profile of the participant accounts matched with the user account through the chatroom.

The user profile management method may further include generating information about the other user accounts to be matched with the corresponding profile so as to correspond to each of the plurality of profiles.

The plurality of profiles may be provided to each of the participant terminals logged in with the participant accounts, based on the matching information.

According to another aspect, a server includes at least one processor configured to create a plurality of profiles corresponding to a user account, receive a view request for a profile of the other user account in a predetermined relationship with the user account from a user terminal logged in with the user account, provide a UI of a profile of the other user account including an interfacing object regarding the profile of the user account to the user terminal, receive an input for selecting a profile to be displayed on the other user terminal logged in with the other user account, among the plurality of profiles corresponding to a user account through an interfacing object, and match the other user account with the selected profile.

The processor may provide the matching profile to the other user terminal as a profile corresponding to the user account.

According to another aspect, a server includes at least one processor configured to create a plurality of profiles corresponding to a user account, match other user accounts in a predetermined relationship with the user account with the plurality of profiles, provide matching information between participant accounts which are participating in a chatroom and the plurality of profiles to a user terminal which is logged in with the user account, through the chatroom in which the user account is participating, and provide a profile of the user account matched with the corresponding participant account, to a participant terminal logged in with the participant account, so as to correspond to each participant account, through the chatroom.

When the processor matches the other user accounts with the plurality of profiles, the processor may receive information about the other user accounts to be matched with the corresponding profile from the user terminal so as to correspond to each of the plurality of profiles and match the other user accounts with the plurality of profiles based on the received information.

The processor may provide a profile of each of the participant accounts matched with the user account to the user terminal, through the chatroom.

According to another aspect, a user terminal is a user terminal logged in with a user account including: at least one processor configured to request creation of a plurality of profiles corresponding to the user account, request a view for a profile of the other user account in a predetermined relationship with the user account, receive a UI of a profile of the other user account including an interfacing object regarding the profile of the user account, and select a profile to be displayed on the other user terminal logged in with the other user account, among the plurality of profiles corresponding to the user account, through the interfacing object.

According to another aspect, a user terminal is a user terminal logged in with a user account including: at least one processor configured to request creation of a plurality of profiles corresponding to the user account in which the plurality of profiles matches with the other user accounts in a predetermined relationship with the user account, receive matching information between participant accounts which are participating in the chatroom and the plurality of profiles, through the chatroom in which the user account is participating, and receive each profile of the participant accounts matched with the user account through the chatroom.

According to example embodiment, the service provides various profiles corresponding to a user, so that a usability of profiles used to represent identification information of the user may be improved.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIGS. 5A and 5B are views illustrating an interfacing object displaying information of a profile of a user account matched with the other user account:

FIGS. 9A to 9C are views illustrating a UI of a chatroom provided to a user terminal according to an example embodiment.

DETAILED DESCRIPTION

Figure 1:
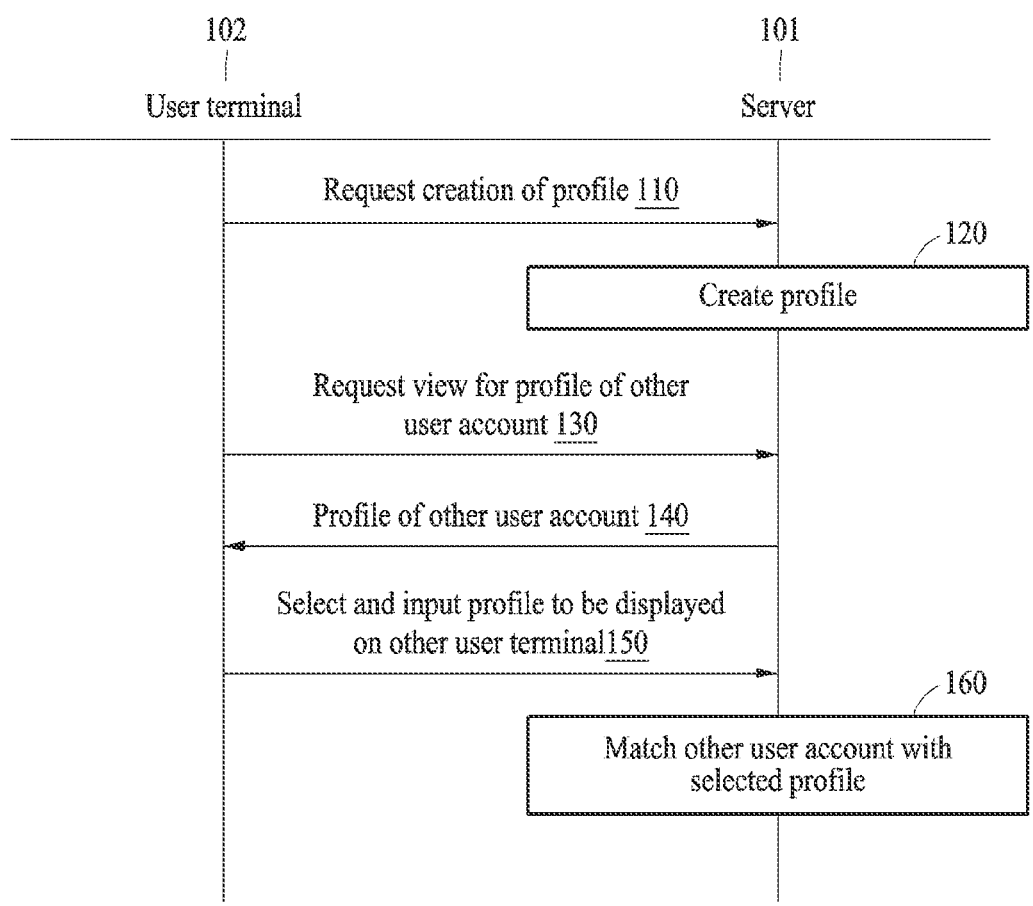
FIG. 1 is a view for explaining a user profile management method for profile matching according to an example embodiment.

Specific structural or functional descriptions for example embodiments are provided for the purpose of illustration only and may be changed in various forms to be implemented. Accordingly, an actually implemented form is not limited only to the specific disclosed example embodiment and the scope of the present specification includes changes, equivalents, or substitutes included in a technical spirit described in the example embodiments.

Even though the terms of first or second are used to describe various components, the terms should be interpreted only to distinguish one component from the other component. For example, a first component may be referred to as a second component, and similarly, a second component may be referred to as a first component.

It should be understood that, when it is described that an element is "connected" to another element, the element may be directly coupled or directly connected to the other element or coupled or connected to the other element through a third element.

A singular form may include a plural form if there is no clearly opposite meaning in the context. In the present specification, it should be understood that terms "include" or "have" indicates that a feature, a number, a step, an operation, a component, a part or the combination those of described in the specification is present, but do not exclude a possibility of presence or addition of one or more other features, numbers, steps, operations, components, parts or combinations, in advance.

Hereinafter, example embodiments will be described in detail with reference to the accompanying drawings. In description with reference to accompanying drawings, the same components are denoted by the same reference numerals regardless of the reference numeral and a duplicated description thereof will be omitted.

FIG. 1 is a view for explaining a user profile management method for profile matching according to an example embodiment.

A user terminal 102 is one of electronic devices such as a computer, a portable computer, a wireless phone, a mobile phone, a smart phone, a personal digital assistant (PDA), and a web tablet and refers to all devices which are capable of installing and executing a service application related to a server 101. At this time, the user terminal 102 may perform an operation for overall services such as configuration of a service screen, data input, data transmission/reception, or data storage under the control of an application and, for example, may be connected to the server 101 through an application.

The server 101 according to an example embodiment may include a server which provides instant messaging services or social networking services. The server 101 may serve as a service platform for communication between user terminals which are connected or accessed to the server 101.

The user may create a user account by subscribing to a service provided by the server 101 and log in with the user account using the user terminal 102 to use the service. The server 101 may provide a service corresponding to the user account to the user terminal 102 logged in with the user account.

The service provided by the server 101 according to the example embodiment provides various profiles corresponding to the user account to improve the usability of the profile in the service. The server 101 which provides the service and the user terminal 102 logged in with the user account subscribed to the service may perform a profile management method to provide a plurality of profiles.

Referring to FIG. 1, a user profile management method performed in the server 101 according to the example embodiment may include a step 120 of generating a plurality of profiles corresponding to a user account, a step 130 of receiving a view request for a profile of the other user account in a predetermined relationship with the user account from the user terminal 102 logged in with the user account, a step 140 of providing a profile of the other user account including an interfacing object regarding the profile of the user account to the user terminal 102, a step 150 of receiving an input for selecting a profile to be displayed on the other user terminal logged in with the other user account, among the plurality of profiles corresponding to the user account through the interfacing object regarding the profile of the user account, and a step 160 of matching the other user account with the selected profile.

The user profile management method performed in the user terminal 102 according to the example embodiment may include a step 110 of requesting creation of the plurality of profiles corresponding to the user account, a step 130 of requesting a view for a profile of the other user account in a predetermined relationship with the user account, a step 140 of receiving a UI of a profile of the other user account including an interfacing object regarding the profile of the user account, and a step 150 of selecting a profile to be displayed on the other user terminal logged in with the other user account, among the plurality of profiles corresponding to the user account through an interfacing object regarding the profile of the user account.

According to the example embodiment, the user terminal 102 may request (the step 110) the server 101 to create a profile including identification information about the logged-in user account and the server may create (the step 120) a profile corresponding to the user account in response to the received request. The profile corresponding to the user account may include identification information according to the setting of the user, such as a profile name, a profile picture, and an introduction message. The profile corresponding to the user account may be provided to the other user account in a predetermined relationship with the corresponding user account and the user account may receive a profile of the other user account in a predetermined relationship (for example, a friend or a subscriber). For example, the user account may form a predetermined relationship with the other user account by registering a contact or an account ID of the other user account. Hereinafter, the other user account in a predetermined relationship with the user account is referred to as a "friend account".

According to the example embodiment, a profile corresponding to a single user account may include two or more profiles. For example, the step 110 according to the example embodiment may include a step of requesting creation of the plurality of profiles and the step 120 according to the example embodiment may include a step of creating a plurality of profiles in response to the request of creation of the plurality of profiles. As another example, the step 110 and the step 120 may be performed many times.

In the plurality of profiles, at least some of identification information included in each profile may be different. For example, a profile name included in the first profile, among the plurality of profiles corresponding to the same account, may be different from a profile name included in a second profile and among the plurality of profiles corresponding to the same account, a profile picture included in the first profile may be different from a profile picture included in a third profile.

Figure 2:
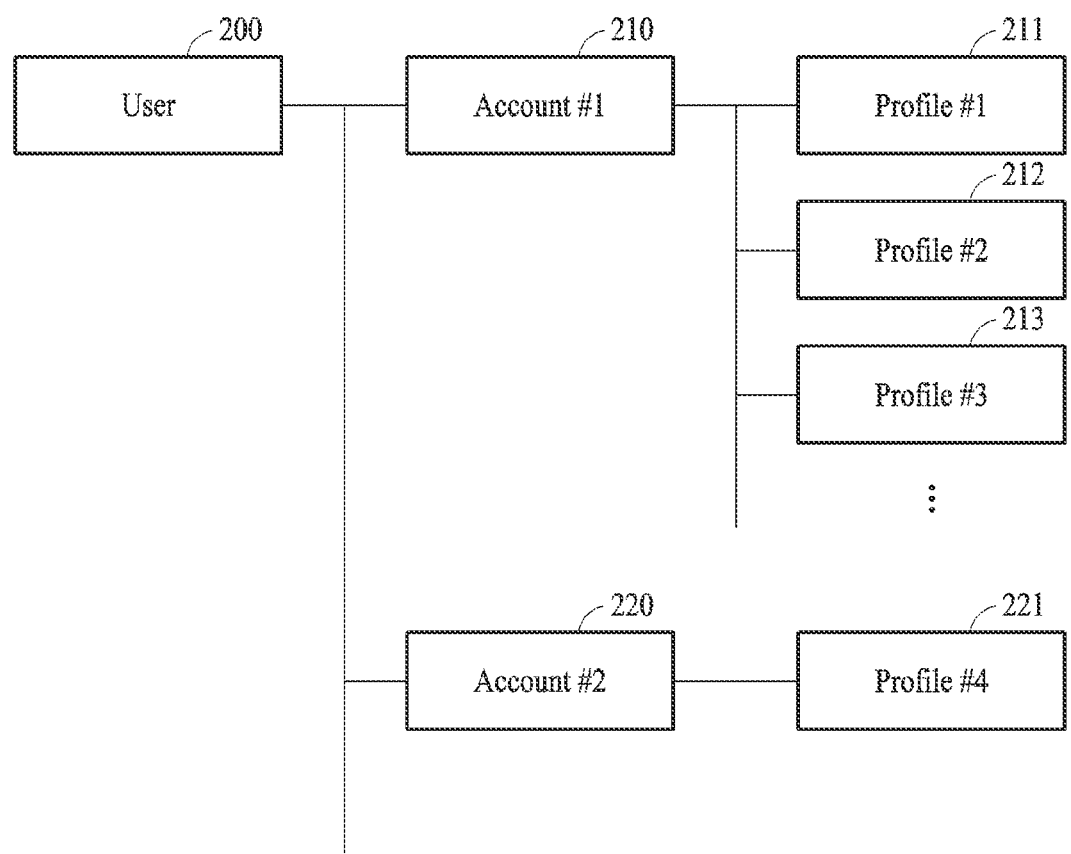
FIG. 2 is a view illustrating a structure of a user, a user account, and a profile according to an example embodiment.

For example, referring to FIG. 2, the user 200 may create at least one user account 210 and 220 corresponding to the service and create a plurality of profiles 211, 212, 213, 221 corresponding to the accounts 210 and 220. For example, the profile corresponding to the first account 210 may include a first profile 211, a second profile 212, and a third profile 213 and the profile corresponding to the second account 220 may include at least one profile such as a fourth profile 221.

According to the example embodiment, a profile corresponding to the user account may include a default profile as a default. For example, a default profile may be created as a default so as to correspond to the user account subscribed into the service and an additional profile may be created so as to correspond to the user account, in response to the request of creation of the profile of the user. For example, in FIG. 2, the first profile 211 corresponding to the first account 210 and the fourth profile 221 corresponding to the second account 220 may correspond to the default profiles. The second profile 212 and the third profile 213 corresponding to the first account 210 may correspond to profiles which are additionally created in accordance with the request of the user corresponding to the first account 210.

Figure 3:
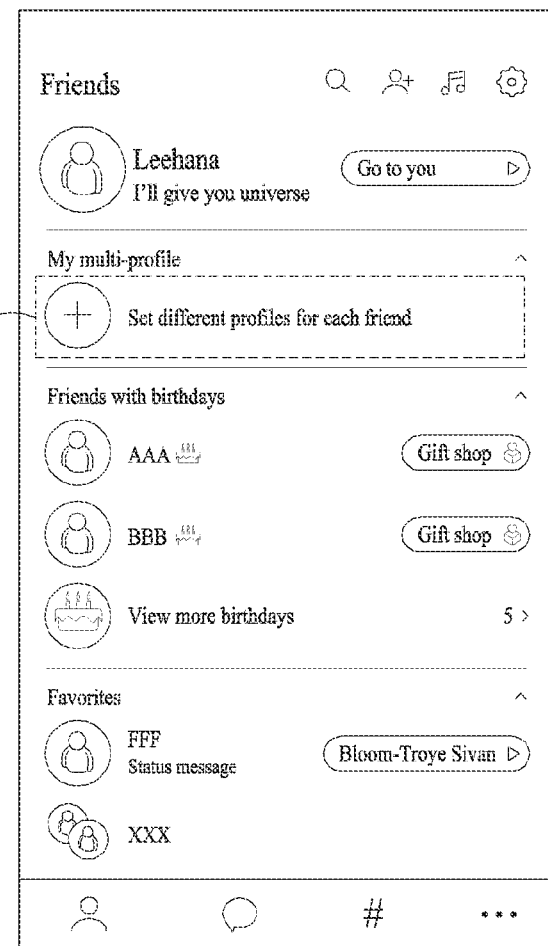
FIG. 3 is a view illustrating a user interface for creating a profile according to an example embodiment.

Referring to FIG. 1 again, the server 101 according to the example embodiment may provide a user interface UI regarding the service to the user terminal 102 and the user terminal 102 may request (110) the server 101 to generate the profile through the UI regarding the service. For example, referring to FIG. 3, the server may provide a UI 300 regarding the service to the user terminal 102 and the user may request the server to create a profile using a button 310 for creating a profile included in the UI 300. When the creation of the profile is requested, the user terminal 102 may set identification information such as a profile name or a profile picture included in the profile and the server 101 may create a profile including identification information according to the setting.

Referring to FIG. 1 again, the user terminal 102 may request (130) the server 101 to view for a profile of the other user account in a predetermined relationship with the user account. For example, when a user account which requests view is a first user account and the other user account whose profile is requested to be viewed by the first user account is a second user account, the user terminal 102 may correspond to the first user terminal which is logged in with the first user account. In this case, the server 101 may receive (130) a view request for a profile of the second user account from the first user terminal 102 to provide (140) a UI of the profile of the second user account to the first user terminal 102. The UI of the profile of the second user account which is provided to the first user terminal 102 according to the example embodiment may correspond to a user interface on which any one profile matched with the first user account, among a plurality of profiles corresponding to the second user account is displayed. The matching between the user account and the profile will be described in detail below.

The UI of the profile of the second user account provided to the first user terminal 102 may include an interfacing object regarding the profile of the first user account. The interfacing object is a configuration which is implemented to interact with the user in the interface and for example, may include a button or the like implemented to be switched to another screen in response to a click input of the user received from the user terminal.

The interfacing object regarding the profile of the first user account included in the UI of the profile of the second user account may correspond to an interfacing object which provides a profile setting function of the first user account to be displayed on a second user terminal logged in with the second user account according to the input of the first user received from the first user terminal 102. The first user may select any one profile to be displayed on the second user terminal, among the plurality of profiles corresponding to the first user account, by means of the interfacing object provided through the first user terminal 102. Further, the first user may change the profile selected to be displayed on the second user terminal to another profile corresponding to the first user account, by means of the interfacing object. To be described below, when any one profile to be displayed on the second user terminal among the plurality of profiles corresponding to the first user account is selected, the selected profile corresponding to the first user account may be matched with the second user account. In other words, an operation of selecting any one profile to be displayed on the second user terminal, among the plurality of profiles corresponding to the first user account may correspond to an operation of selecting any one profile to be matched with the second user account, among the plurality of profiles corresponding to the first user account.

Figure 4A:
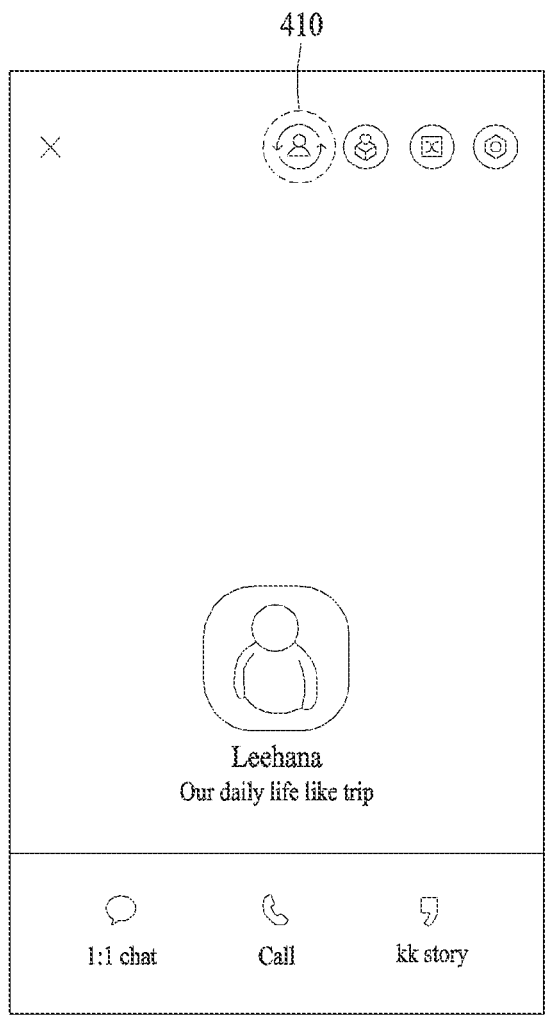
FIGS. 4A and 4B are views illustrating a user interface for setting a profile of a user account to be displayed on the other user terminal through a UI of a profile of the other user account according to an example embodiment.
Figure 4B:
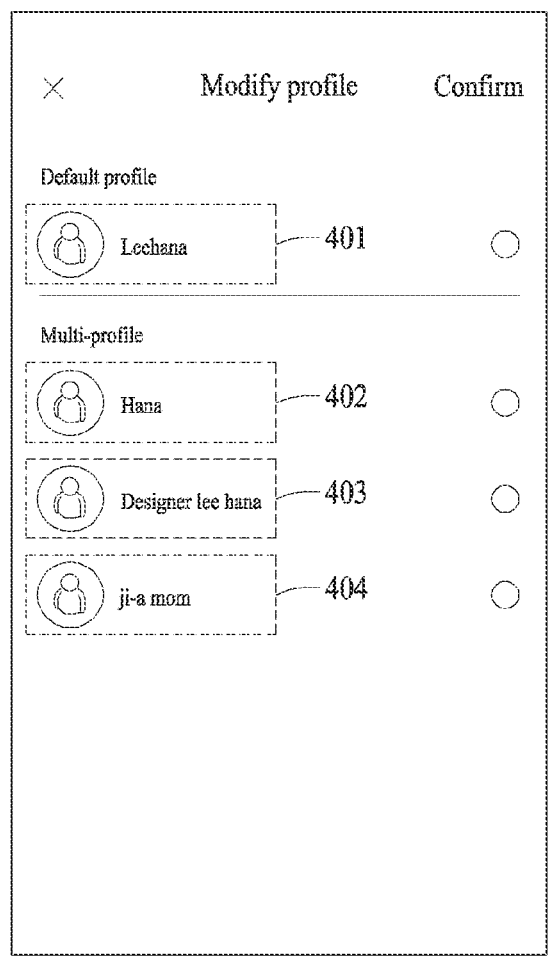

For example. FIG. 4A illustrates a UI of a profile of the second user account which is provided to the first user terminal. Referring to FIG. 4A, the UI of the profile of the second user account provided to the first user account includes an interfacing object 410 regarding the profile of the first user account. The first user selects the interfacing object 410 to enter an interface which sets a profile of the first user account to be displayed on the second user terminal illustrated in FIG. 4B. Referring to FIG. 4B, the first user may identify a profile 404 corresponding to the first user account matched with the second user account through the interface. Further, the first user may select any one profile to be displayed on the second user terminal, among a plurality of profiles 401 to 404 corresponding to the first user account, through the interface. The plurality of profiles corresponding to the first user account may include a default profile 401 provided as a default and additionally created profiles 402, 403, and 404. Hereinafter, at least one profile which is additionally created other than the default profile may be referred to as "multi-profile". The first user may change the profile matched with the second user account to another profile corresponding to the first user account through the interface.

An interfacing object regarding the profile of the first user account included in the UI of the profile of the second user account according to the example embodiment may display information about the profile of the first user account matched with the second user account. For example, referring to FIGS. 5A and 5B, interfacing objects 510 and 520 may be displayed with different colors according to the profile of the first user account matched with the second user account. The interfacing object 510 illustrated in FIG. 5A may indicate that the profile matched with the second user account is a default profile and the interfacing object 520 illustrated in FIG. 5B may indicate that the profile matched with the second user account is the multi-profile.

According to an example embodiment, various example embodiments for displaying information of the profile of the first user account matched with the second user account including displaying the shape of the interfacing object with a picture or a name of the profile matching the second user account may be included in addition to displaying the interfacing objects with different colors.

Referring to FIG. 1 again, when the server 101 receives an input for selecting a profile to be displayed on the second user terminal from the first user terminal 102, the server 101 may match (160) the second user account with the selected profile and store matching information between the second user account and the selected profile so as to correspond to the first user account. According to the example embodiment, the server 101 may provide a profile of the first user account matched with the second user account to the second user terminal. For example, when the server 101 is an instant messaging server which provides an instant messaging service, the first user account and the second user account may correspond to accounts which subscribe to the instant messaging service and the instant messaging server 101 may store matching information between the second user account and the selected profile, in accordance with the first user account and provide a profile of the first user account matching the second user account to the second user terminal.

The server 101 according to the example embodiment may store matching information between a plurality of profiles corresponding to the first user account and the first user account and friend accounts and provide a profile matching a corresponding friend account among profiles of the first user account to a terminal logged in with a specific friend account based on the matching information. In other words, a profile corresponding to the first user account which is provided to the terminal logged in with the specific friend's account may be determined.

Figure 6:
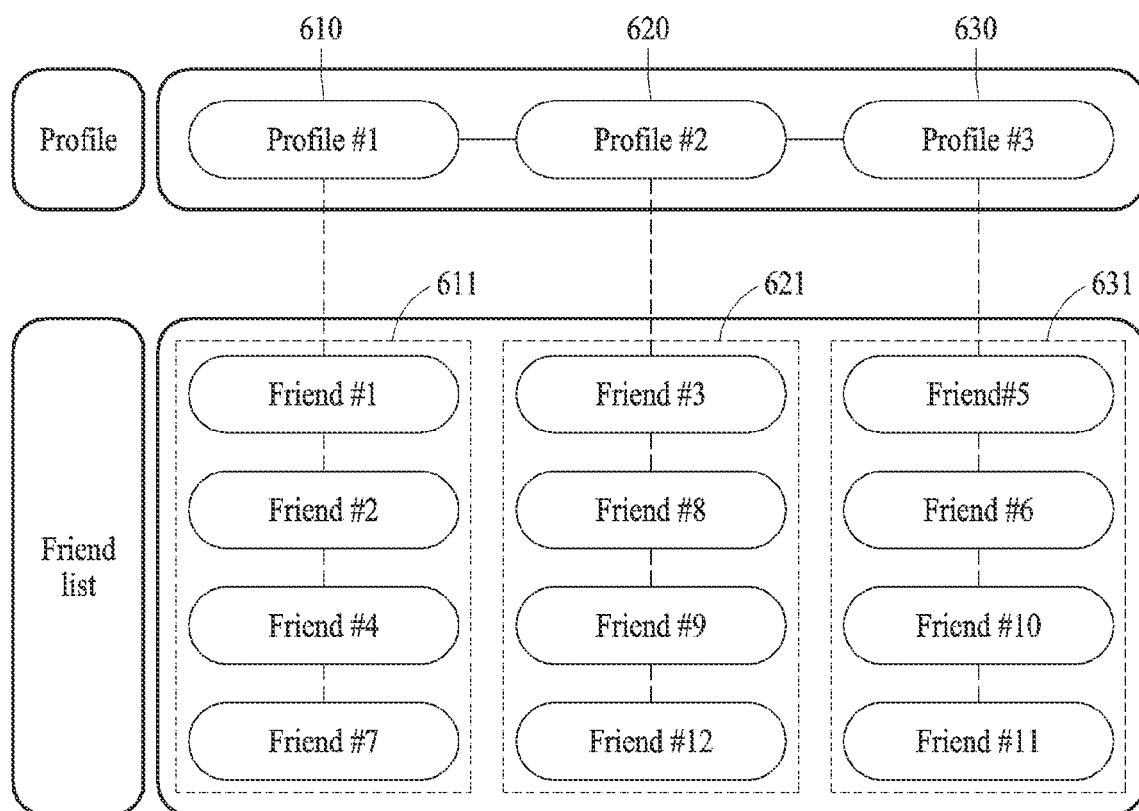
FIG. 6 is a view illustrating matching information between profiles corresponding to a user account according to an example embodiment and friend accounts of the user account.

For example, referring to FIG. 6, profiles corresponding to the first user account may include a first profile 610, a second profile 620, and a third profile 630 and the first user account may set a profile to be displayed on a terminal which is logged in with each friend account through a UI of each profile of each of friend accounts (friend #1 to friend #12). For example, the first profile 610 may be selected as a profile to be displayed on a terminal logged in with the first friend account (Friend #1) through the UI of the profile of the first friend account (Friend #1) and the second profile 620 may be selected as a profile to be displayed on a terminal logged in with the third friend account (Friend #3) through the UI of the profile of the third friend account (Friend #3).

The matching information between the plurality of profiles 610 to 630 and the friend accounts (Friend #1 to Friend #12) may be stored in the server 101. For example, the matching information may include matching information between the first friend account (Friend #1) and the first profile 610 and matching information between the third friend account (Friend #3) and the second profile 620.

Based on the matching information, a profile matched with the corresponding friend account among the plurality of profiles 610 to 630 may be displayed on the terminal logged in with each of the friend accounts (Friend #1 to Friend #12) as a profile of the first user account. For example, the first profile 610 may be provided on a terminal logged in with the first friend account (Friend #1) as a profile corresponding to the first user account and the second profile 620 may be provided on a terminal logged in with the third friend account (Friend #3) as a profile corresponding to the first user account.

According to the example embodiment, a friend account for which a matching profile is not set, among the friend accounts of the first user account may be determined to match a default profile. For example, in FIG. 6, when a profile to be displayed on a terminal logged in with a seventh friend account (Friend #7) is not separately selected by the first user, the seventh friend account (Friend #7) may automatically match the first profile 610 which is a default profile and the default profile 610 may be provided on the terminal logged in with the seventh friend account as a profile corresponding to the first user account.

Figure 7:
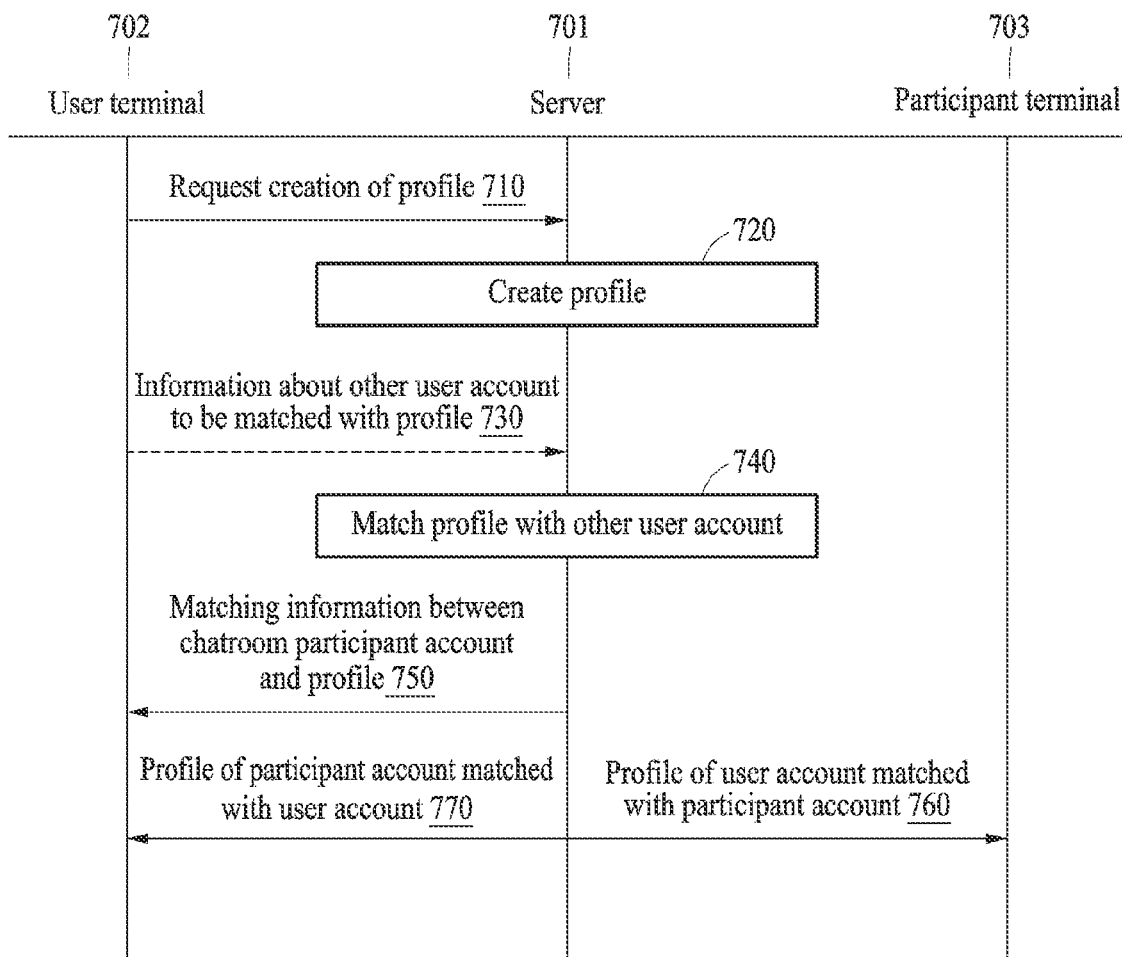
FIG. 7 is a view for explaining a user profile management method regarding profile view according to an example embodiment.

FIG. 7 is a view for explaining a user profile management method regarding profile view according to an example embodiment.

A server 701 and a user terminal 702 according to an example embodiment may correspond to the server 101 and the user terminal 102 described in detail with reference to FIG. 1. A participant terminal 703 according to an example embodiment is a terminal which is distinguished from the user terminal 702 which is provided with a service from the server 701 and may refer to a terminal logged in with a participant account of a chatroom in which the user account is participating. The participant account may refer to an account other than the user account which participates in a chatroom in which the user account is participating.

Referring to FIG. 7, a profile management method performed in the server 701 according to the example embodiment includes a step 720 of creating a plurality of profiles corresponding to a user account, a step 740 of matching other user accounts in a predetermined relationship with the user account and the plurality of profiles, a step 750 of providing matching information between participant accounts which are participating in a chatroom and the plurality of profiles to the user terminal 702 which is logged in with the user account, through the chatroom in which the user account is participating, and a step 760 of providing a profile of the user account matched with the corresponding participant account to the participant terminal 703, through the corresponding chatroom. The step 760 according to the example embodiment may include a step of providing a profile of a user account matched with a corresponding participant account, to the participant terminal 703 logged in with the participant account through the chatroom so as to correspond to each participant account which is participating in the chatroom.

According to the example embodiment, the user profile management method performed in the user terminal 702 logged in with the user account includes a step 710 of requesting creation of a plurality of profiles corresponding to a user account, a step 750 of receiving matching information between participant accounts which are participating in a chatroom and a plurality of profiles corresponding to the user account, through the chatroom in which the user account is participating, and a step 770 of receiving a profile of each participant account matched with the user account, through the chatroom. Here, the plurality of profiles corresponding to the user account may match with the other user accounts (or friend accounts) in a predetermined relationship with the user account.

The steps 710 and 720 according to the example embodiment may correspond to the steps 110 and 120 described in detail with reference to FIG. 1. The server 701 matches the plurality of profiles generated in the step 720 with the friend accounts to generate matching information between the plurality of profiles and the friend accounts.

The step 740 according to the example embodiment may include a step 730 of receiving information about the friend accounts to be matched with the plurality of profiles corresponding to the user account from the user terminal 702 logged in with the user account and a step of matching and storing the friend accounts and the plurality of profiles based on the received information. In the step 730, the information about friend accounts to be matched with the plurality of profiles may include information about the friend accounts to be matched with the corresponding profile, so as to correspond to each of the plurality of profiles and, for example, include a list of the friend accounts to be matched with each profile. The information about the friend accounts to be matched with the plurality of profiles may be created in the user terminal 702 to be transmitted to the server 701. According to an example embodiment, any one profile to be matched with a specific friend account, among the plurality of profiles corresponding to the user account may be set by the interface provided in the user terminal 702 and information about a friend account which is set to be matched with the corresponding profile so as to correspond to each profile corresponding to the user account according to the setting may be created.

For example, referring to FIG. 6, when the plurality of profiles corresponding to the user account includes a first profile 610, a second profile 620, and a third profile 630, information about the friend account to be matched with the corresponding profile may be created so as to correspond to each of the plurality of profiles. Information about the friend accounts to be matched with the profiles may include a list 611 of friend accounts to be matched with the first profile 610, a list 612 of friend accounts to be matched with the second profile 620, and a list 631 of friend accounts to be matched with the third profile 630. The list of friend accounts may include ID information and the like of the friend account for identifying each friend account included in the list.

The server 701 according to the example embodiment may provide matching information between participant accounts of a chatroom in which the user account is participating and the plurality of profiles corresponding to the user account through a corresponding chatroom, based on the generated matching information. The chatroom is a chatroom in which the user account and one or more participant accounts are participating and the participant account of the chatroom may include at least one of the other user accounts which participate in a chatroom in which the user account is participating.

Figure 8:
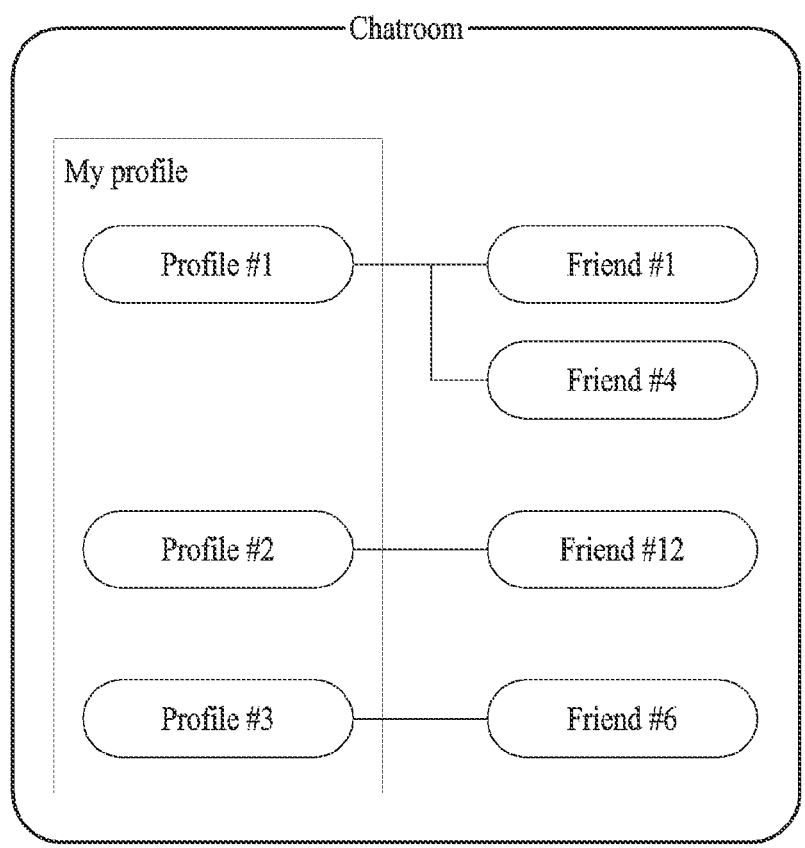
FIG. 8 is a view illustrating matching information between participant accounts and a plurality of profiles provided through a chatroom according to an example embodiment.

The matching information provided in the step 740 according to the example embodiment may correspond to information indicating which profile among the plurality of profiles corresponding to the user account matches with each participant account in the chatroom. For example, the matching information between the participant accounts provided through the chatroom in which some friend accounts among friend accounts (Friend #1 to Friend #12) of the user account illustrated in FIG. 6 participate and the plurality of profiles is illustrated in FIG. 8. Referring to FIG. 8, the matching information provided through the chatroom in which the user account and the participant accounts (Friends #1, #4 , #6, and #12) are participating may include information of a participant account matching the corresponding profile, so as to correspond to each of the plurality of profiles. To be more specific, information of participant accounts (Friends #1 and #4) matching the first profile (Profile #1), information of a participant account (Friend #12) matching the second profile (Profile #2), and information of a participant account (Friend #6) matching the third profile (Profile #3) may be provided to the user account through the chatroom.

According to the example embodiment, the step 740 may include a step of providing a list of participant accounts matched with the corresponding profile so as to correspond to each of the plurality of profiles through the UI of the chatroom. An example of the UI of a chatroom for providing matching information between the participant accounts and the plurality of profiles will be described in detail with reference to FIGS. 9A to 9C.

According to the example embodiment, the server 701 may provide (760) a profile of the user account matched with the corresponding participant account to each of participant terminals logged in with the participant accounts through the chatroom. For example, when the user account, the first participant account, and the second participant account participate in the first chatroom and a profile of the user account matched with the first participant account is a first profile, the first profile may be provided to the first participant terminal logged in with the first participant account as a profile corresponding to the user account, through the first chatroom. In the meantime, when a profile of the user account matched with the second participant account is a second profile, the second profile may be provided to the second participant terminal logged in with the second participant account as a profile corresponding to the user account, through the first chatroom.

According to the example embodiment, the server 701 may provide (770) to the user terminal 702 a profile of each of participant accounts matched with the user account through the chatroom. For example, any one profile matched with the user account, among the plurality of profiles corresponding to the first participant account, may be provided to the user terminal 702 as a profile of the first participant, through the chatroom. Further, any one profile matched with the user account, among the plurality of profiles corresponding to the second participant account, may be provided to the user terminal 702 as a profile of the second participant, through the chatroom.

From the server 701's point of view, the operation of providing (760) a profile of the user account matched with the participant account to the participant terminal 703 and an operation of providing (770) a profile of the participant account matched with the user account to the user terminal 702 are the operation of providing the profile of the other participant account matched with a specific participant account which is participating in the chatroom to the corresponding participant account, which are the same operations in which only the receiving subject is differently expressed.

According to the example embodiment, when the profile of the participant account of the chatroom is provided to the user terminal 702 through the chatroom in which the user account is participating, it means that the participant account is displayed on the UI of the chatroom provided to the user terminal 702 as a profile of the participant account. For example, when a message is transmitted from the participant account through the chatroom, the UI of the chatroom provided to the user terminal 702 may display the corresponding message and the profile of the participant account together to display that the message is transmitted from the participant account. Alternatively, the UI of the chatroom provided to the user terminal 702 may provide a list of the participants of the chatroom including the participant account and the participant account in the participant list may be displayed by a profile of the participant account.

The user terminal 702 according to the example embodiment may receive matching information between the participant accounts which are participating in the chatroom and the plurality of profiles corresponding to the user account from the server 701 through the chatroom and receive a profile of the other participant account matched with the user account. The matching information and the profile of the other participant account received from the server 701 through the chatroom may be displayed on the user terminal 702 through the UI of the chatroom.

FIGS. 9A to 9C are views illustrating a UI of a chatroom provided to a user terminal according to an example embodiment.

Referring to FIG. 9A, the UI of the chatroom provided from the server may display the message transmitted from the participant account of the chatroom together with the profile of the corresponding participant account in the order that the message is transmitted. The profile of the participant account displayed on the UI of the chatroom may correspond to a profile of the participant account matched with the user account logged in by the user terminal on which the UI of the chatroom is displayed. An example of the UI of the chatroom which is differently displayed depending on the profile of the participant account matched with the user account will be described in detail with reference to FIGS. 10A and 10B.

It is possible to enter the UI on which the list of the participant accounts of the chatroom illustrated in FIG. 9B through a side menu 901 in the chatroom of FIG. 9A. Referring to FIG. 9B, the participant list 902 of the chatroom displayed on the UI of the chatroom may include a profile(s) 903 of the user accounts and a profile(s) of the participant(s). A profile of the participant account included in the participant list 902 may include any one profile matched with the user account, among the plurality of profiles corresponding to the participant account. According to the example embodiment, the participant list 902 of the chatroom may include the profile(s) 903 of the user account matched with the participant accounts of the chatroom.

According to the example embodiment, the participant list 902 may include any one profile among the plurality of profiles corresponding to the user account. For example, the default profile of the user account is included in the participant list to be displayed through the UI of the chatroom. Alternatively, a profile which is the most matched with participant accounts of the chatroom, among the plurality of profiles corresponding to the user account, or any one profile which is set in advance by a user is included in the participant list 902 to be displayed through the UI of the chatroom.

It is possible to enter the UI through which the matching information between the participant accounts which are participating in the chatroom illustrated in FIG. 9C and the plurality of profiles corresponding to the user account through the profile 903 of the user account illustrated in FIG. 9B. Information of participant accounts of the chatroom matched with the corresponding profile may be displayed on the UI through which the matching information is provided, so as to correspond to each of the plurality of profiles corresponding to the user account. For example, referring to FIG. 9C, the list 905 of the participant accounts matched with the first profile 904 corresponding to the user account may be displayed on the UI.

Figure 10A:
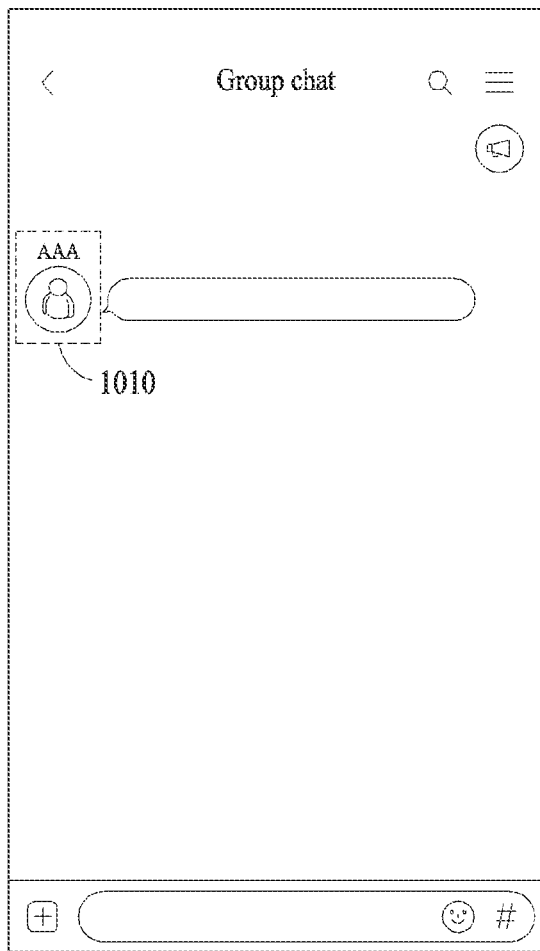
FIGS. 10A and 10B are views illustrating UIs of a chatroom according to a profile of a user account matched with a participant account.
Figure 10B:
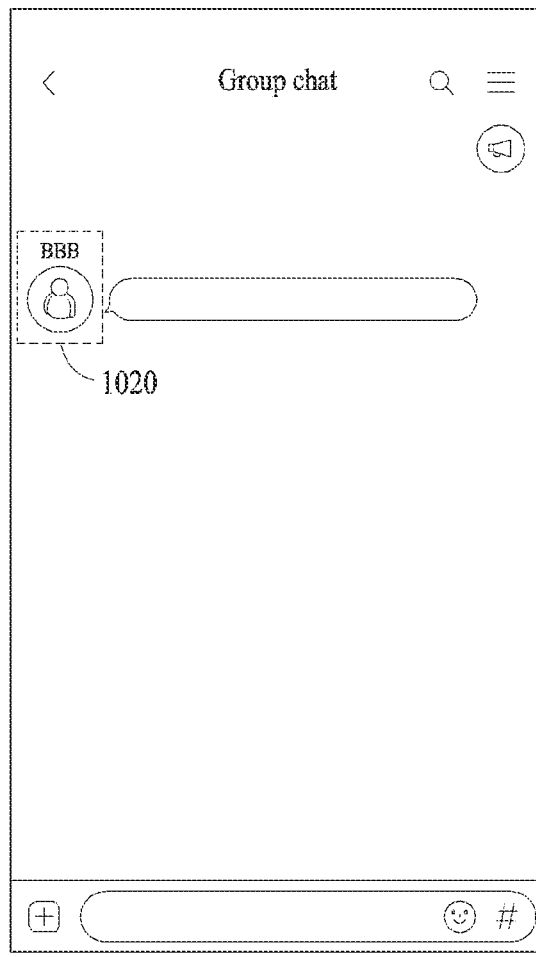

FIGS. 10A and 10B are views illustrating UIs of a chatroom according to a profile of a user account matched with a participant account.

FIG. 10A illustrates that a message transmitted through the chatroom and a profile 1010 of a third participant account which transmits the message are displayed on a UI of the chatroom provided to the first participant terminal logged in with the first participant account. In the meantime, FIG. 10B illustrates that the same message as illustrated in FIG. 10A and a profile 1020 of the third participant account which transmits the message are displayed on a UI of the chatroom provided to the second participant terminal logged in with the second participant account.

Referring to FIGS. 10A and 10B, the profile 1010 of the third participant account displayed on the first participant terminal and the profile 1020 of the third participant account displayed on the second participant terminal may be different depending on the profile of the third participant account matched with the first participant account and the profile of the third participant account matched with the second participant account. For example, referring to FIG. 10A, the profile of the third participant account displayed on the first participant terminal is the first profile 1010, which may include a profile name and a profile picture corresponding to the first profile. In contrast, referring to FIG. 10B, the profile of the third participant account displayed on the second participant terminal is the second profile 1020, which may include a profile name and a profile picture corresponding to the second profile.

In other words, in the same chatroom, a profile of a specific participant account matched with each participant account may vary and the profile of the specific participant account may be differently displayed on different terminals logged in with different participant accounts, depending on the profile of the specific participant account matched with each participant account.

FIGS. 11A to 11F are views illustrating a user interface for setting a profile corresponding to a user account according to an example embodiment.

According to the example embodiment, a user interface for setting a profile may include various user interfaces which provide a function of managing a plurality of profiles corresponding to the user account such as functions of creating a profile, setting the matching of the profile, editing identification information included in the profile, and deleting a profile.

According to the example embodiment, the user interface for setting the matching of the profile may include various user interfaces which provide an editing function of the matching information of the plurality of profiles corresponding to the user account and friend accounts. The editing function of the matching information may include an operation of removing the matching between the profile and the friend account or creating the matching between the profile and the friend account.

The server according to the example embodiment may provide an interface of setting a profile of the user account to be displayed on a terminal logged in with the corresponding friend account through the UI of the profile of the friend account, as described above. The server according to the example embodiment may provide an interface of setting a profile of the user account to be displayed on a terminal logged in with the friend account through the UI of the profile of the user account.

Figure 11A:
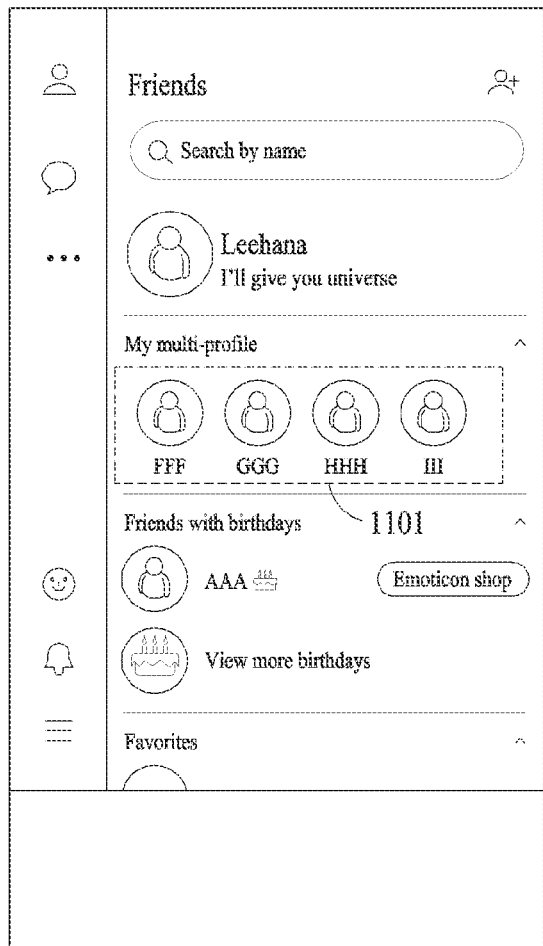
FIGS. 11A to 11F are views illustrating a user interface for setting a profile corresponding to a user account according to an example embodiment.
Figure 11B:
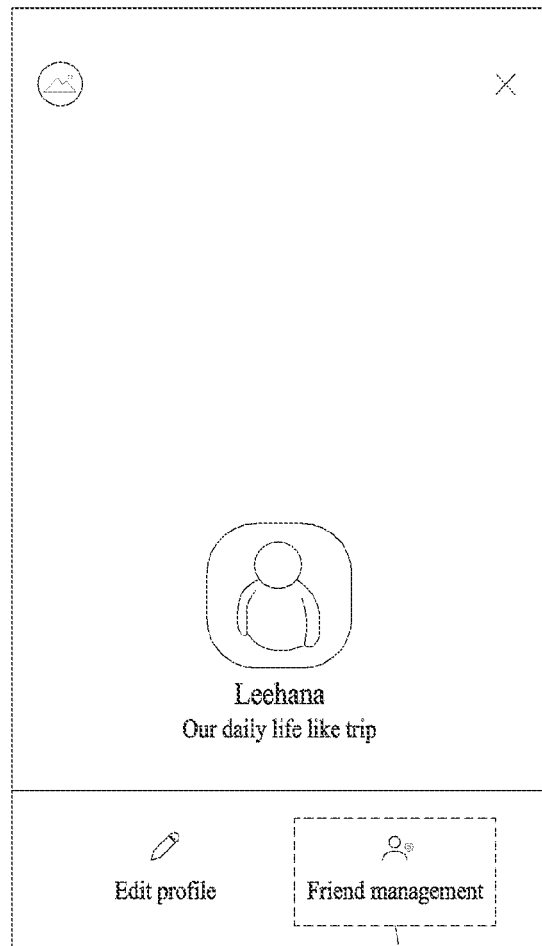

For example, referring to FIG. 11A, the user may request the UI of the profile corresponding to the user account to the server through the interfacing object 1101 relating to the profile corresponding to the user account and referring to FIG. 11B, the server may provide the UI of the profile corresponding to the user account in response to the request. The user may enter the interface of FIG. 11C to edit the friend account in which the profile is displayed through the interfacing object 1102 regarding friend management included in the UI of the profile corresponding to the user account.

Figure 11C:
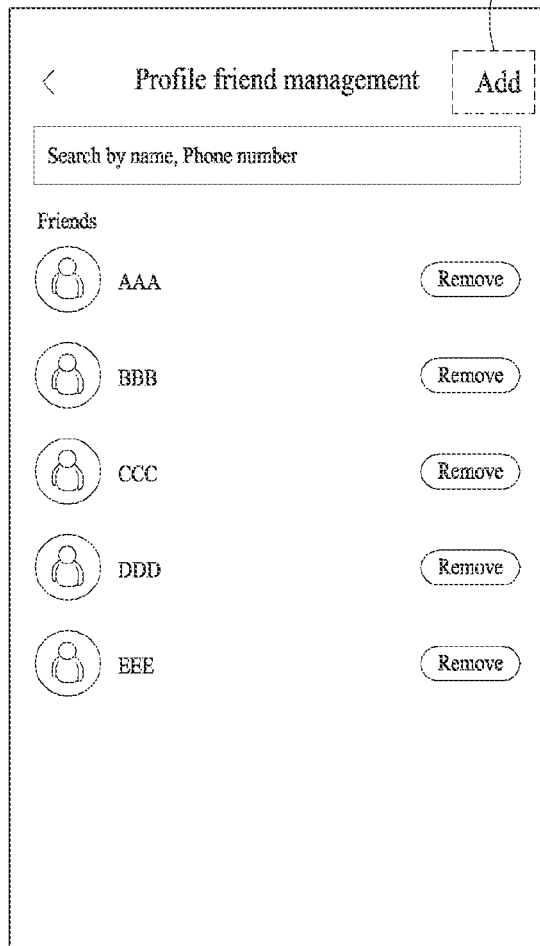

The user may check the list of the friend accounts matched with the corresponding profile through the interface for editing the friend account illustrated in FIG. 11C and request to remove the matching between the profile and the friend account or create matching between the profile and a new friend account.

Figure 11D:
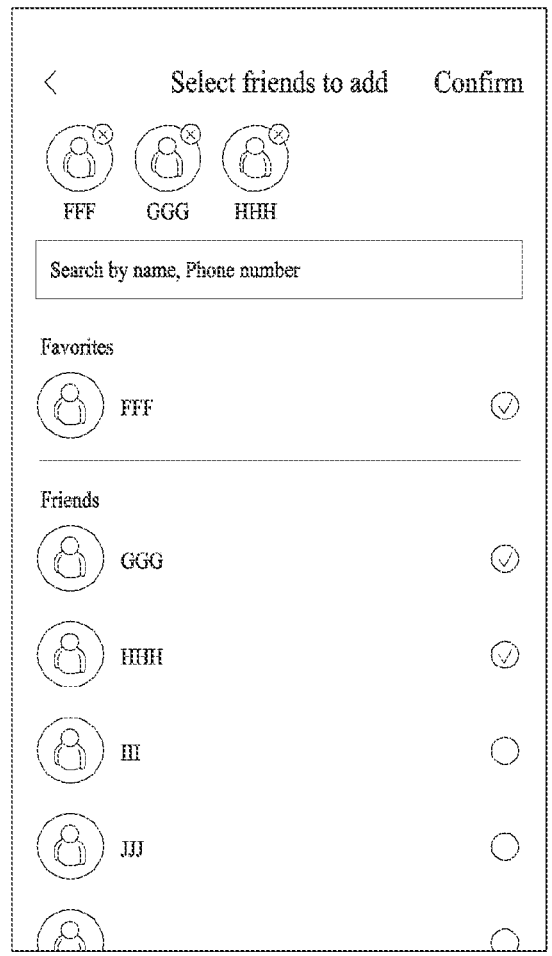
Figure 11E:
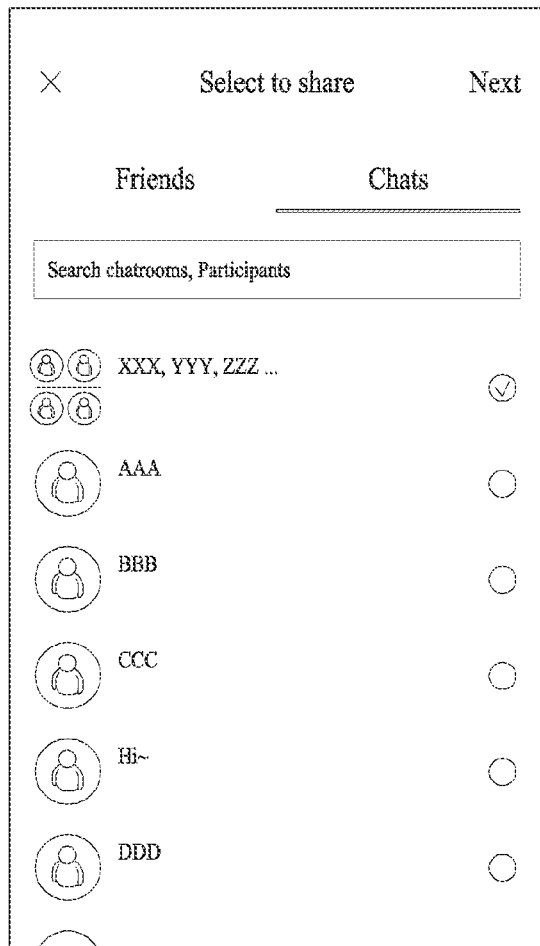

According to the example embodiment, the user may enter an interface for selecting a friend account of FIG. 11D through the interfacing object 1103 included in the interface of FIG. 11C. Referring to FIG. 11D, a new friend account(s) to be matched with the profile is selected by the interface for selecting a friend account to request the server to create new matching. According to the example embodiment, at least one friend account to be matched with the corresponding profile may be selected based on the list of friend accounts of the user account. For example, the interface for selecting the friend account may provide a list of friend accounts and a picker and the user may select at least one friend account to be matched with the corresponding profile from the list of friend accounts using the picker.

Figure 11F:
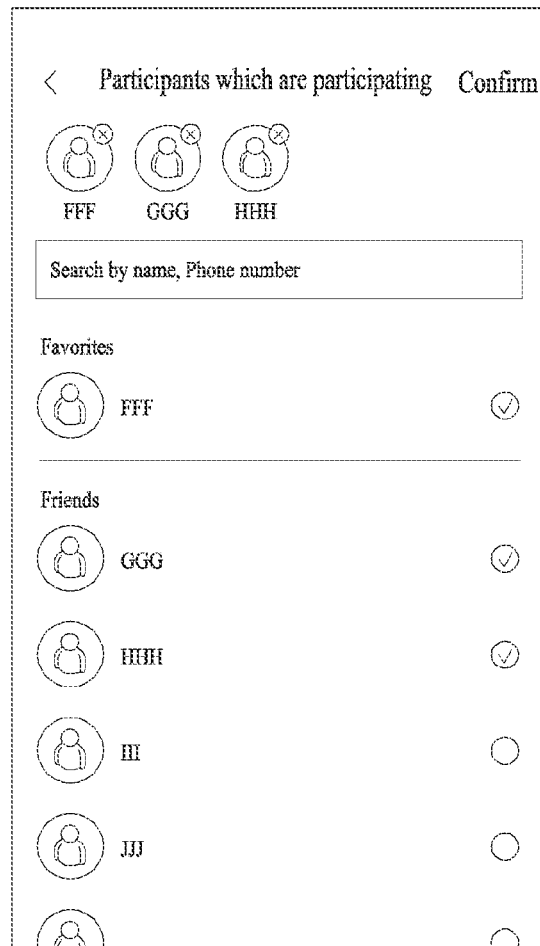

According to the example embodiment, a friend account in which the corresponding profile is displayed may be selected based on the list of chatrooms in which the user account is participating. For example, referring to FIG. 11E, the interface for selecting a friend account may provide a list of chatrooms in which the user account is participating and a picker and the user may select at least one chatroom from the list of chatrooms using the picker. Referring to FIG. 11F, when the chatroom is selected, the interface for selecting a friend account may provide a list of participant accounts which are participating in the selected chatroom and a picker and the user may select at least one participant account to be matched with the corresponding profile from the list of participant accounts using the picker.

Figure 12A:
FIGS. 12A and 12B are views for explaining an example embodiment in which friend lists according to a profile are sorted.
Figure 12B:
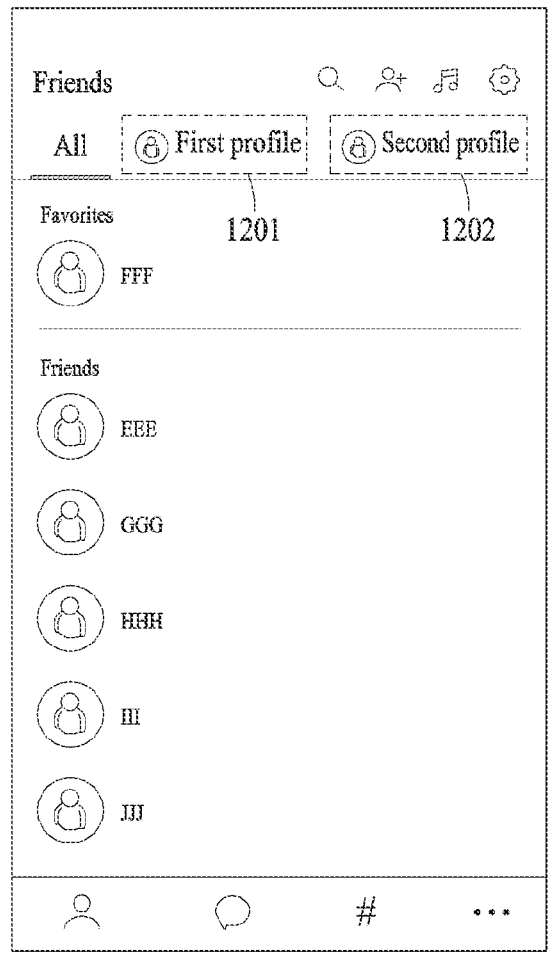

FIGS. 12A and 12B are views for explaining an example embodiment in which friend lists according to a profile are sorted.

According to an example embodiment, the list of friend accounts corresponding to the user account may be sorted according to the matching profiles. For example, friend account(s) matched with each of the profiles may be sorted according to a predetermined order between the plurality of profiles corresponding to the user account and the friend account(s) matched with the same profile may be sorted according to a predetermined order (for example, an alphabetic order).

According to an example embodiment, the list of friend accounts corresponding to the user account may be filtered according to the matching profiles. For example, a list of friend accounts matched with a specific profile among the list of all friend accounts corresponding to the user account may be filtered to be displayed.

For example, referring to FIG. 12A, the user may set to sort the list of friend accounts by the matching profile using the provided user interface. Referring to FIG. 12B, the list of all friend accounts may be sorted according to the order between profiles, based on the matching profile. For example, the list of all the friend accounts may be sorted according to the order of the first profile and the second profile such that friend account(s) matched with the first profile are sorted first, and then friend account(s) matched with the second profile are sorted.

According to the example embodiment, referring to FIG. 12B, when each profile tab 1201 or 1202 is selected from the interface on which the list of friend accounts is displayed, friend account(s) matched with the corresponding profile are filtered to be displayed. For example, when the first profile tab 1201 is selected, a list of friend accounts matched with the first profile among the friend accounts corresponding to the user account may be displayed and when the second profile tab 1202 is selected, a list of friend accounts matched with the second profile among the friend accounts corresponding to the user account may be displayed.

Figure 12C:
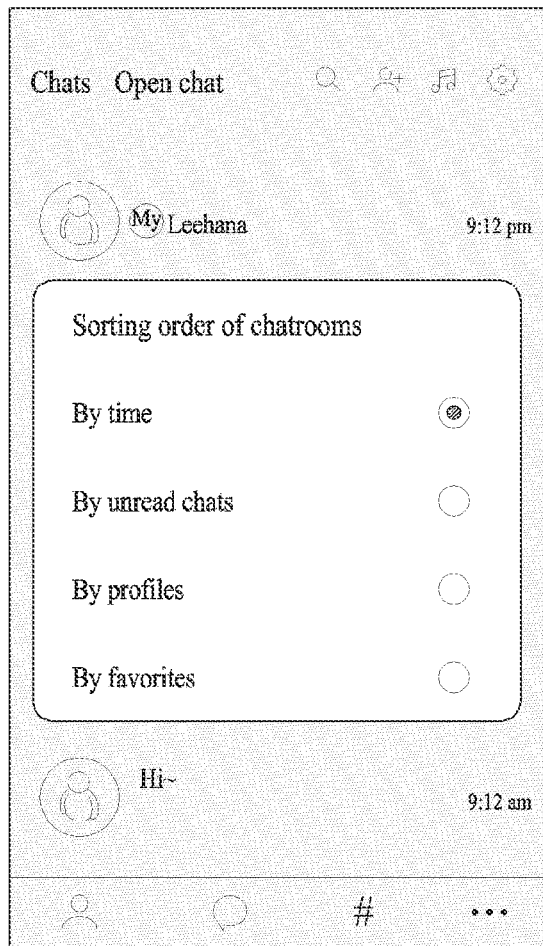
FIGS. 12C and 12D are views for explaining an example embodiment in which a list of chatrooms according to a profile is sorted.
Figure 12D:
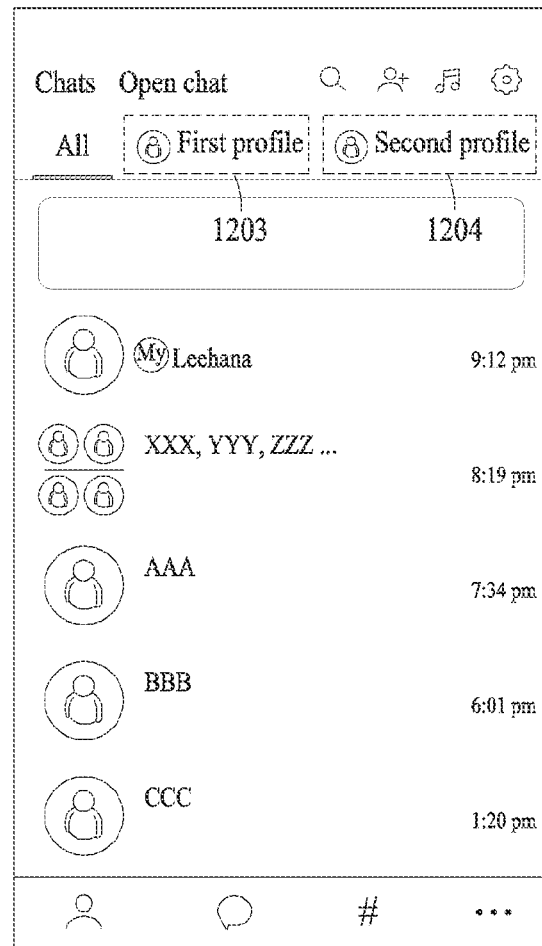

FIGS. 12C and 12D are views for explaining an example embodiment in which a list of chatrooms according to a profile is sorted.

According to an example embodiment, a list of chatrooms in which the user account is participating may be sorted according to a predetermined order between the plurality of profiles, based on the profile matched with the participant account included in the chatroom. When the plurality of participant accounts included in the chatroom and the plurality of profiles match, the sorting order of the chatrooms may be determined based on a profile having a highest priority, among the plurality of matching profiles. The priority between the plurality of profiles is determined according to a predetermined order for sorting the plurality of profiles and for example, when the plurality of profiles is sorted in the ascending order of spellings of the profile names, the sooner the profile name is spelled, the higher the priority of the profile may be determined. For example, when the participant accounts of the chatroom are matched with the first profile and the second profile and the first profile and the second profile are sorted according to the ascending order of spellings of the profile names, the chatroom may be sorted according to the order of the first profile with the earlier spelling of the profile name.

According to an example embodiment, a list of chatrooms in which the user account is participating may be filtered according to a profile, based on the profile matched with the participant account included in the chatroom. When the plurality of participant accounts included in the chatroom and the plurality of profiles match, the chatrooms may be filtered so as to correspond to the plurality of matching profiles. For example, when the participant accounts of the chatroom are matched with the first profile and the second profile, the chatroom may be filtered by the first profile or may be filtered by the second profile.

For example, referring to FIG. 12C, the user may set to sort the list of chatrooms in which the user account is participating based on the profile matched with the participant account included in the chatroom using the provided user interface. Referring to FIG. 12D, the list of all chatrooms may be sorted according to the order between profiles, based on the profile matched with the participant account. For example, the list of all the chatrooms may be sorted according to the order of the first profile and the second profile such that chatroom(s) including a participant account matched with the first profile are sorted first, and then chatroom(s) including a participant account matched with the second profile are sorted.

According to the example embodiment, referring to FIG. 12D, when each profile tab 1203 or 1204 is selected from the interface on which the list of chatrooms is displayed, chatroom(s) including participant accounts matched with the corresponding profile are filtered to be displayed. For example, when the first profile tab 1203 is selected, a list of chatroom(s) including participant accounts matched with the first profile among the chatrooms in which the user account is participating may be displayed and when the second profile tab 1204 is selected, a list of chatroom(s) including participant accounts matched with the second profile among the chatrooms in which the user account is participating may be displayed.

The apparatus according to the example embodiment is an apparatus which performs the above-described profile management method and may include a server and a terminal. The apparatus may include a processor, a memory, and an input/output device.

The processor of the apparatus according to the example embodiment may perform at least one method described above with reference to FIGS. 1 to 12D. The memory may be a volatile memory or a non-volatile memory and store information relating to a profile management method. According to an example embodiment, the memory may store a program in which the above-described profile management method is implemented and the processor may execute the program stored in the memory and control the apparatus.

The apparatus according to the example embodiment may receive an input from the user through an input/output device and provide output data to interact with the user and may be connected to an external device (for example, another terminal or network) and exchange data.

The example embodiments described above may be implemented by a hardware component, a software component, and/or a combination of the hardware component and the software component. For example, the device, the method, and the components described in the example embodiments may be implemented, for example, using a general purpose computer or a special purpose computer such as a processor, a controller, an arithmetic logic unit (ALU), a digital signal processor, a microcomputer, a field programmable gate array (FPGA), a programmable logic unit (PLU), a microprocessor, or any other device which executes or responds instructions. The processing device may perform an operating system (OS) and a software application which is executed on the operating system. Further, the processing device may access, store, manipulate, process, and generate data in response to the execution of the software. For ease of understanding, it may be described that a single processing device is used, but those skilled in the art may understand that the processing device includes a plurality of processing elements and/or a plurality of types of processing element. For example, the processing device may include a plurality of processors or include one process and one controller. Further, another processing configuration such as a parallel processor may be allowed.

The software may include a computer program, a code, an instruction, or a combination of one or more of them and configure the processing device to be operated as desired or independently or collectively command the processing device. The software and/or data may be permanently or temporarily embodied in an arbitrary type of machine, component, physical device, virtual equipment, computer storage medium, or device, or signal wave to be transmitted to be interpreted by a processing device or provide command or data to the processing device. The software may be distributed on a computer system connected through a network to be stored or executed in a distributed manner. The software and data may be stored in a computer readable recording medium.

The method according to the example embodiment may be implemented as a program instruction which may be executed by various computers to be recorded in a computer readable medium. The computer readable medium may store the program instruction, a data file, or a data structure alone or in combination and the program instruction stored in the medium may be specifically designed and configured for the example embodiment or known to be available to those skilled in the art of computer software. Examples of the computer readable recording medium include magnetic media such as a hard disk, a floppy disk, or a magnetic tape, optical media such as a CD-ROM or a DVD, magneto-optical media such as a floptical disk, and a hardware device which is specifically configured to store and execute the program instruction such as a ROM, a RAM, and a flash memory. Examples of the program instruction include not only a machine language code which is created by a compiler but also a high level language code which may be executed by a computer using an interpreter.

The hardware device may operate as one or a plurality of software modules in order to perform the operation of the example embodiment and vice versa.

As described above, although example embodiments have been described by limited drawings, those skilled in the art may apply various technical modifications and changes based on the above description. For example, even when the above-described techniques are performed by different order from the described method and/or components such as systems, structures, devices, or circuits described above are coupled or combined in a different manner from the described method or replaced or substituted with other components or equivalents, the appropriate results can be achieved.

Therefore, other implements, other embodiments, and equivalents to the claims are within the scope of the following claims.

What is claimed is:

1. A user profile management method which is performed in a server, comprising:
   creating a plurality of profiles of a first user account;
   receiving a view request for a profile of a second user account in a predetermined relationship with the first user account from a first user terminal logged in with the first user account;
   providing a UI of the profile of the second user account including an interfacing object regarding the profiles of the first user account to the first user terminal;
   receiving an input for selecting a profile of the first user account to be displayed on a second user terminal logged in with the second user account, among the plurality of profiles of the first user account through the interfacing object; and
   matching the second user account with the selected profile of the first user account.

2. The user profile management method of claim 1, further comprising:
   providing the matched profile to the second user terminal as a profile corresponding to the first user account.

3. The user profile management method of claim 1, wherein the profile of the second user account corresponds to a profile matched with the first user account, among a plurality of profiles of the second user account.

4. The user profile management method of claim 1, wherein the interfacing object is differently displayed depending on a profile matched with the second user account.

5. A user profile management method which is performed in a server, comprising:
   creating a plurality of profiles of a first user account;
   matching second user accounts in a predetermined relationship with the first user account with the plurality of profiles of the first user account;
   providing matching information between participant accounts which are participating in a chatroom and the plurality of profiles of the first user account to a first user terminal which is logged in with the first user account, through the chatroom in which the first user account is participating, wherein the participant accounts are included in the second accounts; and
   providing respective profiles of the first user account matched with each of the participant accounts to participant terminals logged in with each respective participant account through the chatroom, wherein a first profile is provided to a first participant terminal and a second profile is provided to a second participant terminal.

6. The user profile management method of claim 5, wherein the matching of the second user accounts with the plurality of profiles includes:
   receiving information about the second user accounts to be matched with each of the plurality of profiles of the first user account from the first user terminal; and matching the second user accounts with the plurality of profiles of the first user account based on the received information to store.

7. The user profile management method of claim 5, wherein the providing of matching information includes:

providing a list of the participant accounts matched with each of the plurality of profiles through a UI of the chatroom, wherein the list of the participant accounts includes a first list of the participant accounts matched with the first profile among the plurality of profiles and a second list of the participant accounts matched with the second profile among the plurality of profiles.

8. The user profile management method of claim 5, further comprising:

providing a profile of each of the participant accounts matched with the first user account to the first user terminal, through the chatroom.

9. A user profile management method performed in a first user terminal which is logged in with a first user account, the method comprising:

requesting creation of a plurality of profiles of the first user account;

requesting a view for a profile of a second user account in a predetermined relationship with the first user account;

receiving a UI of the profile of the second user account including an interfacing object regarding the plurality of profiles of the first user account; and selecting a profile to be displayed on a second user terminal logged in with the second user account, among the plurality of profiles of the first user account through the interfacing object, wherein the selected profile matches with the second user account.

10. A user profile management method performed in a first user terminal which is logged in with a first user account, the method comprising:

requesting creation of a plurality of profiles of the first user account, the plurality of profiles matched with second user accounts in a predetermined relationship with the first user account;

receiving matching information between participant accounts which are participating in a chatroom and the plurality of profiles of the first account, through the chatroom in which the first user account is participating, wherein the participant accounts are included in the second accounts, and receiving a profile of each of the participant accounts matched with the first user account through the chatroom.

11. The user profile management method of claim 10, further comprising:

generating information about the second user accounts to be matched with each of the plurality of profiles of the first accounts.

12. The user profile management method of claim 10, wherein the plurality of profiles of the first account is provided to each of participant terminals logged in with each of the participant accounts, based on the matching information.

13. A computer program stored in a medium to be coupled to hardware to execute the method according to claim 1.

14. A server, comprising:

At least one processor configured to:

create a plurality of profiles of a first user account, receive a view request for a profile of a second user account in a predetermined relationship with the first user account from a first user terminal logged in with the first user account, provide a UI of a profile of the second user account including an interfacing object regarding the profiles of the first user account to the first user terminal, receive an input for selecting a profile to be displayed on a second user terminal logged in with the second user account, among the plurality of profiles of the first user account, through the interfacing object, and match the second user account with the selected profile.

15. The server of claim 14, wherein the processor provides the matching profile to the second user terminal as a profile corresponding to the first user account.

16. A server, comprising:

at least one processor configured to:

create a plurality of profiles of a first user account, match second user accounts in a predetermined relationship with the first user account with the plurality of profiles of the first user account, accounts which provide matching information between participant are participating in a chatroom and the plurality of profiles of the first user account to a first user terminal which is logged in with the first user account, through the chatroom in which the first user account is participating, wherein the participant accounts are included in the second accounts, and provide respective profiles of the first user account matched with each of the participant accounts, to participant terminals logged in with each respective participant account through the chatroom, wherein a first profile is provided to a first participant terminal and a second profile is provided to a second participant terminal.

17. The server of claim 16, wherein when the processor matches the other user accounts with the plurality of profiles, the processor configured to:

receive information about the second user accounts to be matched with each of the plurality of profiles of the first user account from the first user terminal, and match the second user accounts with the plurality of profiles of the first user account based on the received information.

18. The server of claim 16, wherein the processor provides a profile of each of the participant accounts matched with the first user account to the first user terminal, through the chatroom.

19. A user terminal logged in with a first user account, the user terminal comprising:

at least one processor configured to:

request creation of a plurality of profiles of the first user account, request a view for a profile of a second user account in a predetermined relationship with the first user account, receive a UI of a profile of the second user account including an interfacing object regarding the plurality of profiles of the first user account, and select a profile to be displayed on a second user terminal logged in with the second user account, among the plurality of profiles of the first user account, through the interfacing object, wherein the selected profile matches with the second user account.

20. A user terminal logged in with a first user account, the user terminal comprising:
- at least one processor configured to:
- request creation of a plurality of profiles of the first user account, the plurality of profiles matched with second user accounts in a predetermined relationship with the first user account,
- receive matching information between participant accounts which are participating in a chatroom and the plurality of profiles of the first account, through the chatroom in which the first user account is participating, wherein the participant accounts are included in the second accounts, and
- receive a profile of each of the participant accounts matched with the first user account through the chatroom.

* * * * *